Patented July 13, 1937

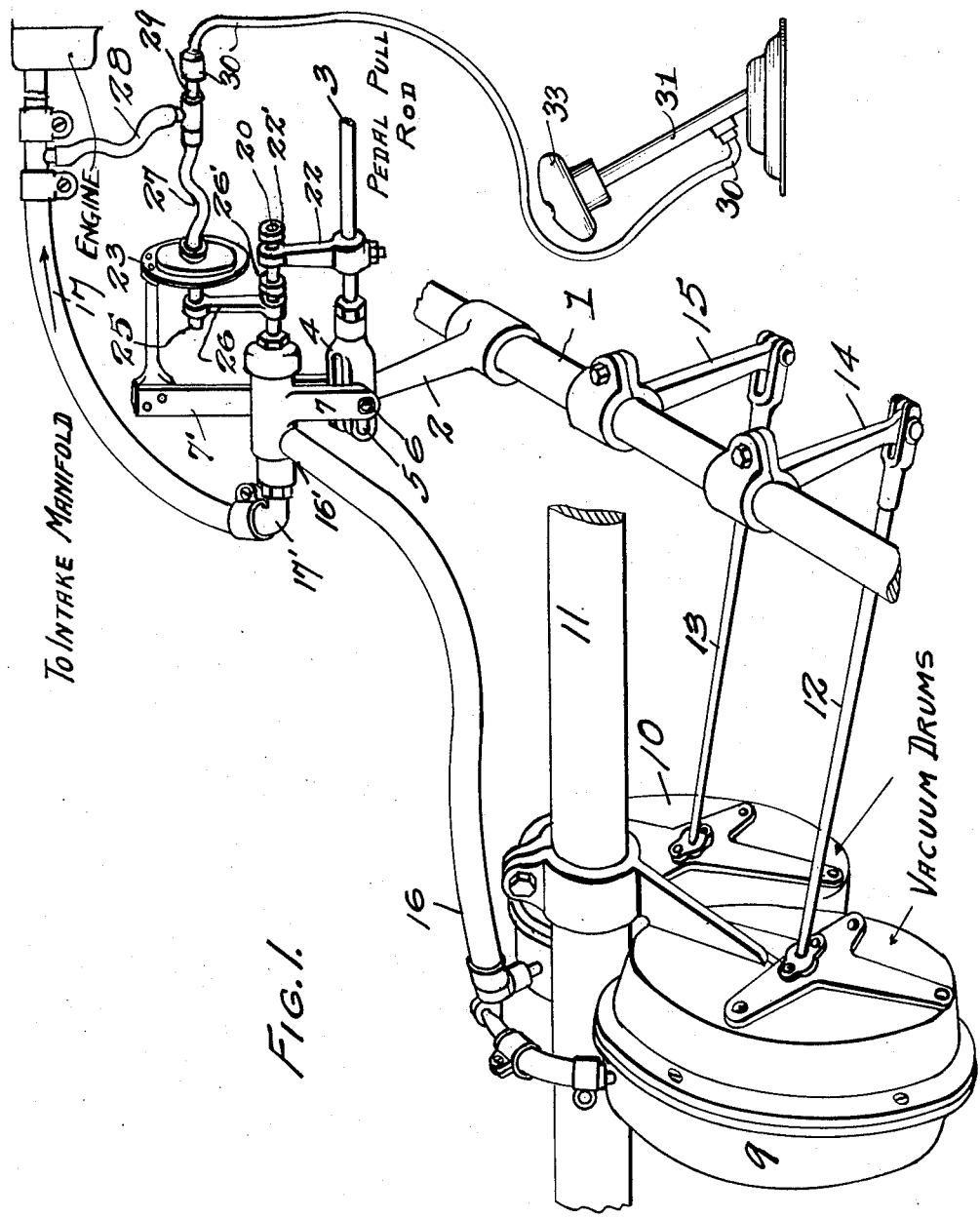

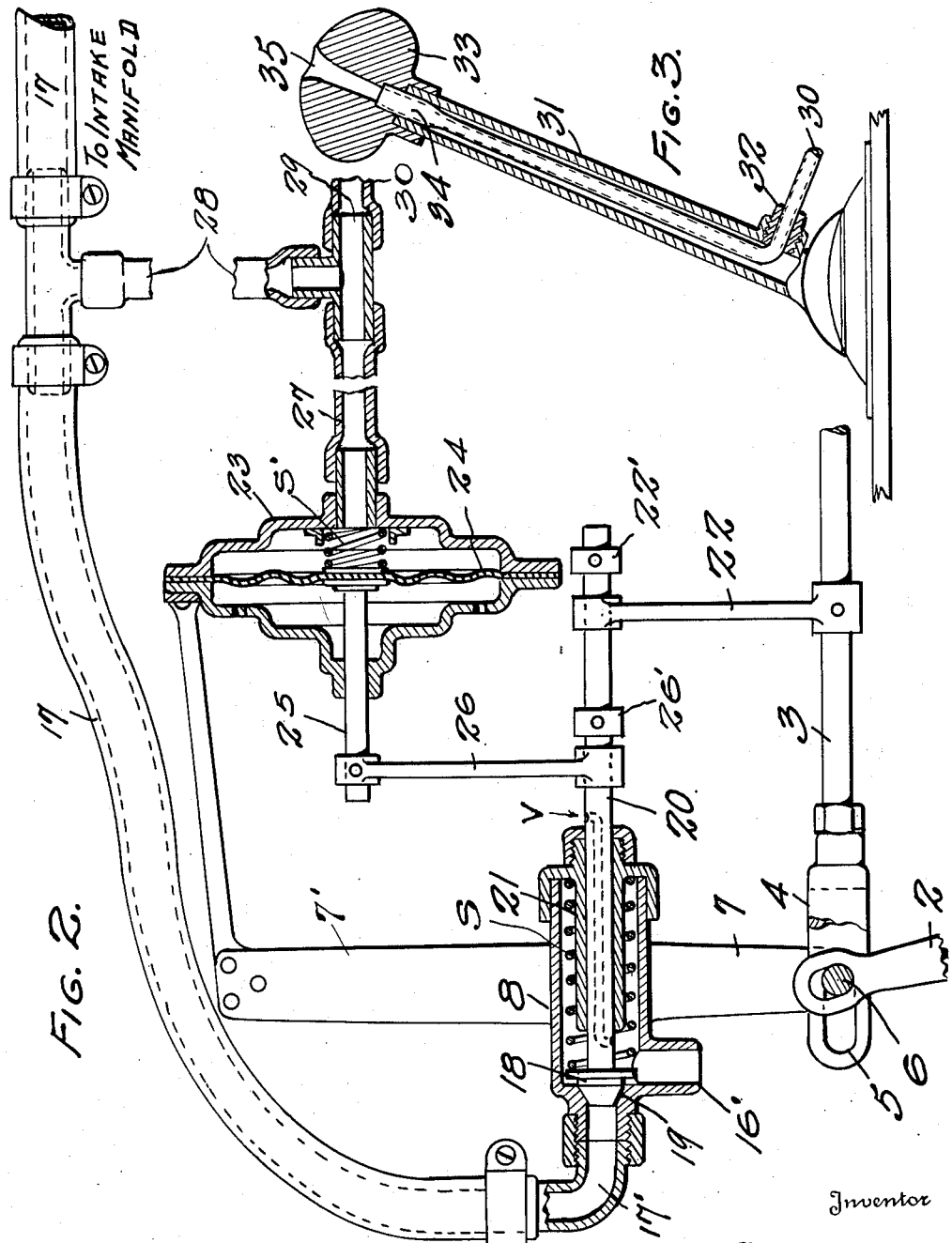

2,086,661

UNITED STATES PATENT OFFICE 2,086,661

ENGINE OPERATED CONTROL FOR POWER BRAKES

Douglas Collins, Salisbury, N. C.

Application June 12, 1935, Serial No. 26,264

8 Claims. (Cl. 188—152)

My present invention relates to an improved engine operated control for power brakes, particularly as applied to the suction operated mechanism for applying and releasing the brakes of automotive vehicles propelled by power from an internal combustion engine.

The engine operated control mechanism of my invention is or may be combined with brake operating mechanism which is actuated by fluid pressure created by the engine, and my control mechanism is adapted for use either with or without the mechanical control means, as a brake pedal or a brake lever, usually employed in combination with the use of fluid pressure or suction from the engine for controlling the application of the brakes.

In carrying out my invention I employ, as an auxiliary means for controlling the brakes, a vacuum-control power device of the diaphragm type, which is inoperative under conditions of equalized fluid pressure at opposite sides of the diaphragm, but which becomes operative as an automatic auxiliary, to control the use of the fluid pressure created by the engine, when the pressure at the sides of the diaphragm is varied instead of equalized.

Thus, as an example, I employ in connection with a valve for controlling the use of the fluid pressure created by the engine for operating the brakes, a diaphragm vacuum-device or control unit which includes a diaphragm which is open alternately at one side to atmospheric pressure and to the action of suction created by the engine. Means are employed whereby the suction created by the engine is utilized to reduce the pressure at the engine side or vacuum side of the diaphragm thereby creating a differential pressure at opposite sides of the diaphragm. This differential pressure renders the diaphragm unit operative to open the valve which controls the use of the fluid pressure created by the engine for applying the brakes, and when the valve is so opened, the brakes are applied. When the pressure in the diaphragm unit is again equalized, the valve is automatically closed to cut off the fluid pressure created by the engine, and the brakes are thus released.

The auxiliary control unit is automatically rendered operative at the election of the driver of the automotive vehicle through the agency of an atmospheric port associated with a control device for the vehicle, such as the gear shift lever, or other device that is usually located in position where it is readily accessible to the driver of the vehicle. Thus the auxiliary control unit is rendered operative by the simple action of capping the atmospheric port with the thumb or finger of the driver while he is simultaneously manipulating a control device of the vehicle.

The invention consists in certain novel combinations and arrangements of parts as will hereinafter be more fully set forth and claimed. In the accompanying drawings I have illustrated one complete example of the physical embodiment of my invention in which the auxiliary control unit is combined with a conventional brake operating mechanism that is operated by motive fluid pressure created by the internal combustion engine and controlled by the usual pedal pull rod, but it will be understood that the structures illustrated in the drawings are exemplifications, only, of the invention, and that changes and alterations are contemplated and may be made in carrying out my invention, and therefore I do not limit the scope of my invention to the disclosure in the drawings.

Figure 1 is a perspective view of a well known type of brake operating mechanism operative under fluid pressure created by the engine, and equipped with one form of auxiliary control unit of my invention.

Figure 2 is an enlarged detail view, partly in section, showing the relation of the auxiliary control unit to a conventional valve-control mechanism for the fluid pressure created by the engine for operating the brakes.

Figure 3 is a detail sectional view of a gearshift lever equipped with an atmospheric port that communicates with the auxiliary control unit of Figures 1 and 2.

In order that the general assembly and arrangement and utility of parts may readily be understood I have indicated in Figure 1 a transversely arranged shaft 1 which is oscillated or rocked for the application of the brakes of a vehicle, and to release the brakes. The shaft is provided with a rock arm 2 that may be pulled or swung to the right in Figure 1 by a pull on the pull rod 3 which is actuated by the usual brake pedal.

The pull rod 3 is connected to the rocker arm 2 by means of a clevis 4 mounted on the end of the rod and provided with slots 5 for the pivot or hinge pin 6 that is supported in bracket arms 7 forming part of the valve casing 8. If desired, by depression of the brake pedal in usual manner, the brakes may be applied through the action of the pull rod and rocker arm, which turns the brake shaft 1 to apply the brakes.

For power application of the brakes through the agency of motive fluid pressure created by the engine of the automotive vehicle, two vacuum drums of the diaphragm type are indicated at 9 and 10. These power units or drums are mounted conveniently on the housing 11 of the drive shaft of the vehicle and they are connected by rods 12 and 13 to the complementary lever arms 14 and 15 attached to the rock shaft 1 of the brake operating mechanism.

The power units 9 and 10 of the brake operating mechanism are connected by a suction pipe or hose 16 to a port 16' of the valve casing 8, and the suction pipe or hose 17 connected to the nipple or port 17' of the casing 8 extends to the intake manifold, and through the manifold communicates with the interior of the engine cylinders.

The brake operating mechanism is thus adapted to rock the shaft 1, and the latter is connected in suitable manner with the brakes for the application thereof, and for their release.

The rods 12 and 13 are moved longitudinally under power exerted within the interior of the vacuum drums, and the power is supplied through the agency of the motive fluid pressure created by the engine. The suction from the engine extends through the hose 17 and 16 to the vacuum drums, and this communication is controlled by a suitable valve as 18 in the casing 8 which is shown as seated by spring S in the port 19 located between the two ports or nipples 16' and 17' of the valve casing. With the valve closed, communication is cut off between the engine and the vacuum drums of the brake-operating mechanism, and therefore the latter is inoperative. When the valve is unseated to establish suction and fluid pressure between the engine and the drums, the mechanism becomes operative to apply the brakes.

The reciprocal valve is provided with a slide-stem 20 which may be supported to slide in the guide sleeve 21 in the interior of the casing. The valve stem has an axial passage V vented to the atmosphere at one end, and the other end of this passage opens to the interior of the cylinder when the valve is closed. The valve stem projects beyond the casing and is connected to the pull rod 3 by means of an arm 22 having a head which encircles the stem loosely, and a second head on the arm is rigidly secured to the pull rod. Adjacent the loose connection of the arm 22 with the valve stem is located an adjustable collar 22' that is fixed in adjusted position on the stem, as by a set bolt.

Thus, in addition to the mechanical application of the brakes by a pull on the rod 3 and turning of the brake shaft through the arm 2, the valve 18 may also be unseated against tension of spring S by a pull on the rod 3, thereby establishing communication between the engine and the vacuum drums for a power, or fluid pressure, application of the brakes.

It will be observed that as the valve stem moves to the right to open the valve, the interior or inner port of the vent V is closed within the sleeve 21, thus cutting off communication between the interior of the valve casing and the atmosphere.

In addition to the above two controls of the brakes, I provide an auxiliary control unit for the control valve, which auxiliary control device for the control valve is at all times in communication with the interior of the engine, and at the election of the driver of the vehicle this auxiliary control device is open to the atmosphere when the brakes are inoperative, or closed from the atmosphere to render the brakes operative under fluid pressure created by the engine.

The auxiliary control device includes a casing or drum 23 supported on a bracket 7' which is rigid with the cylinder 8, and in the casing is mounted a diaphragm 24, having a stem 25 that extends to the exterior of the casing and is provided with a fixed arm 26. The depending arm 26 is fashioned with an end-head that loosely encircles the valve stem 20, and adjacent to this loose end-head is mounted a fixed, but adjustable collar 26'.

In Figure 2, the pressure at opposite sides of the diaphragm is equalized by the use of a spring S'; and the valve 18 is held closed by its spring S. When the pressure at the right side, or engine side of the diaphragm 24 is reduced, as by suction, to a degree lower than the pressure at the left side of the diaphragm, the latter is moved to the right by fluid pressure. This movement of the diaphragm, through the stem 25 and arm 26, causes arm 26 to contact with collar 26' and thereby slide the valve stem in its guide sleeve, closing vent V, and opening valve 18, thereby establishing communication for motive fluid pressure created by the engine between the engine and the drums to actuate the brake-operating mechanism, and apply the brakes.

A flexible suction hose or pipe 27 is connected to the diaphragm casing at the engine side thereof, and a flexible hose 28 connects pipe 27 with the main suction pipe 17 that communicates with the intake manifold of the engine. The auxiliary suction pipe 27 is provided with a nipple 29 beyond the coupling pipe 28, and an air pipe or hose 30 has one of its ends connected to the nipple. The air pipe or hose 30 is extended to a control device of the vehicle that is readily accessible to the driver of the vehicle, and in the drawings I have illustrated this device as a tubular gear shift lever 31, which may be provided near its base with a nipple 32 through which the hose 30 is passed. The open end of the air hose or pipe terminates in a usual type of head or handle 33 for the lever, and the open end 34 of the hose or air pipe is fitted in air-tight manner within the head 33. The head is fashioned with an air port 35 that opens at a suitable point on the exterior periphery of the head, and the port extends through the head to the open end of the air pipe 30.

In the drawings, with the valve 18 closed, the suction from the engine extends through pipe 17 to the closed valve 18, and through the auxiliary pipes 28, 27 to the diaphragm casing and through the air pipe 30 to the air port 35, and the combined influence of fluid pressure at the left side of the diaphragm together with the suction and atmospheric pressure at right side of the diaphragm, is equalized, to maintain the diaphragm in neutral position. By capping the air port 35, and thus shutting off atmospheric pressure through hose 30, the pressure at the engine side or vacuum side of the diaphragm is reduced as compared with the pressure at the left side of the diaphragm, and consequently, the control valve 18 is opened as described.

It will be understood that while the brakes are applied as a consequence of the action of capping the port 35 of the bleeder line (gear shift lever), they are automatically released when the engine is accelerated or speeded-up for a start of the automobile, due to the fact that acceleration of the engine decreases the vacuum pressure. This release of the brakes is accomplished even though the port remain capped, and without necessity for uncapping the port of the bleeder line. The means for thus automatically releasing the brakes, while the port 35 remains capped under these conditions, consists of the valve spring S and the servo-motor operating to close valve 18, together with the decrease in vacuum pressure resulting from the acceleration of the engine. After the brakes are thus released, and the engine is maintained at a constant speed, the port 35 must be uncapped and thus opened to the atmosphere, to prevent undesired reapplication of the brakes in the event of deceleration of engine speed and a consequent increase in vacuum pressure.

If and when the engine speed is reduced, and the port 35 is capped, valve 18 will automatically be opened and the brakes will automatically be applied, due to the increased vacuum pressure resulting when the engine speed is thus decelerated or lowered.

As will readily be apparent, the air port 35 is convenient for access by the thumb or finger of the driver of the vehicle, and one of these digits may be used to cap the port 35.

Thus one of the essential features of my invention is the use of a bleeder line which is connected, in this instance, through pipe 28 and the suction hose 17 to the intake manifold of the engine, with which manifold the line is in constant communication. This bleeder line, which is connected to the motor by pipe 27, is also, normally, open to the atmosphere through pipe 30 and the port 35, the port being here shown in the gear shift lever 31.

By capping the bleeder line, as by placing the thumb over port 35, the bleeder line is rendered inaccessible to atmospheric pressure, and the condition thus arising in the bleeder line causes the suction from the intake manifold to develop differential fluid pressure within the motor thereby actuating the motor to open the valve 18 for an application of the brakes. When the thumb is removed from the port 35, thus rendering the bleeder line again accessible to atmospheric pressure, the fluid pressure at the opposite sides of the diaphragm 24 of the motor tends to equalize, and the compressed springs S and S' automatically close the valve 18, and render the motor inoperative.

There are numerous advantages accruing from the use of, and meritorious features involved in the construction and arrangement of my auxiliary control device for operation of the control valve of the fluid pressure operated brake-operating mechanism.

For instance, in commercial devices of the type illustrated in the drawings, without the presence of my auxiliary control unit, the brake operating mechanism is under control of the foot which depresses the brake pedal of the vehicle. Inasmuch as the foot of the driver that is available to depress the brake pedal is usually applied to the accelerator, or held in readiness to be applied to the accelerator, it will be apparent that this foot must first be removed from the accelerator before it can be applied to the brake pedal. Often it is necessary for the driver to "hunt" or "feel" for the brake pedal with his foot, before the pedal can be depressed, thus losing valuable time, and, in addition, the removal of the foot from the accelerator results in loss of control of the fuel feed mechanism.

By the utilization of the auxiliary control device of my invention, the above undesirable features and other objections are overcome; the necessity for removing the foot from the accelerator is dispensed with and the foot remains at all times in proper relation to the accelerator for control of the fuel supply.

The auxiliary control device is especially advantageous in use when an automobile has been stopped on a hill. Under usual conditions where the brake operating mechanism illustrated (and similar mechanisms) is actuated by depressing the brake pedal, one foot is applied to the clutch pedal, and the other foot which has been removed from the accelerator is applied to the brake pedal. The feet are then held in this position until a start is desired. When starting, the foot is hastily removed from the brake pedal and quickly applied to the accelerator. This rapid shifting of the foot frequently results in excessive depression of the accelerator and consequent jumping forward of the vehicle, or, on the other hand, if the foot movement is too slow, the vehicle starts to roll under gravity before power can be applied. These conditions frequently cause stalling of the engine, excessive spinning of the vehicle wheels, and other undesirable and unsafe consequences.

When the automobile is equipped with the auxiliary control device of my invention, in stopping on a hill, the clutch pedal is depressed by one foot while the other foot remains on the accelerator. By hand, the lever 31 is shifted to neutral and a finger or thumb of the same hand caps the airport 35. In starting, with the clutch disengaged, the lever 31 is shifted to low speed while the port is still capped, the accelerator is depressed as usual, the clutch is engaged, and the airport is uncapped, resulting in a smooth and uniform starting of the vehicle, without danger of gravity-roll, and without undue strains being imparted to the driving gear. This use of the hand for controlling the brakes leaves both feet free to apply to the clutch pedal and the accelerator, and one foot is at all times applied to each of these control devices, while the hand that controls the gear shift lever also controls the brakes.

In the event that it becomes necessary for a driver to slow down his automobile before turning a corner in the street, the foot remains in control position on the accelerator, the driver grasps the gear shift lever 31 and shifts it to neutral position, and caps the airport 35 with his thumb or finger thus applying the brakes. After the corner is turned the port is uncapped, and the lever is manipulated to resume speed.

For an emergency application of the brakes, this may be accomplished more rapidly and with greater assurance by the use of my auxiliary control device than by the customary depression of the foot lever or brake pedal. The rapidity and accuracy of movement of the hand in capping the airport is greater than the movement of the foot in depressing the brake pedal. This accuracy in the movement of the hand and assurance of minimum of time required for reliable application of the brakes is especially advantageous when the automobile is traveling at high speed, and thus adds to the safety of high speed travel.

Having thus fully described my invention, what I claim as new and desire to secure by Letters Patent is:—

1. In a vacuum operated braking system for automotive vehicles, the combination with an internal combustion engine, its intake manifold, and a control valve for the braking system, of a bleeder line connected with and constantly open to the intake manifold and normally open to the atmosphere, a motor for operating the control valve and connected to the bleeder line, said bleeder line being adapted to be capped and thereby rendered inaccessible to atmospheric pressure to cause the suction to develop differential fluid pressure within the motor to operate the valve for applying the brakes, and automatic means for rendering the motor inoperative when the bleeder line is rendered accessible to atmospheric pressure by tending to equalize pressures in the motor.

2. In a vacuum operated braking system for automotive vehicles, the combination with an internal combustion engine, its intake manifold, and a spring-retracted control valve for the braking system, of a bleeder line connected with and constantly open to the intake manifold and normally open to the atmosphere, a motor for operating the control valve and connected to the bleeder line, said bleeder line being adapted to be capped and thereby rendered inaccessible to atmospheric pressure to cause differential fluid pressure within the motor to operate the valve for applying the brakes, and a spring device for rendering the motor inoperative when the bleeder line is rendered accessible to atmospheric pressure by tending to equalize pressures in the motor.

3. The combination with an automotive propelling engine and its intake manifold, fluid pressure operated brake-applying mechanism, and means for controlling said mechanism, of a control device for said means, a bleeder line in constant communication with the intake manifold and normally open to the atmosphere, said control device connected to the bleeder line and operated by differential fluid pressure when the bleeder line is capped and thereby rendered inaccessible to atmospheric pressure, and automatic means for rendering the control device inoperative when the bleeder line is rendered accessible to atmospheric pressure by tending to equalize pressure in the control device.

4. The combination with an automotive propelling engine, brake applying mechanism operated by suction created by the engine through a suction passage, and a valve controlling said passage, of a bleeder line connected with said passage between the engine and the valve constantly open to said passage and normally open to the atmosphere, a valve-control device connected to the bleeder line and adapted to open the valve under differential pressure when the bleeder line is rendered inaccessible to atmospheric pressure, and automatic means tending to equalize pressure on the control device and close the valve when the bleeder line is rendered accessible to the atmosphere.

5. The combination with an automotive propelling engine, suction operated brake-applying mechanism including a suction passage, and a spring-closed valve controlling said passage, of a bleeder line connected to said passage between the engine and valve, said line being constantly open to the passage and normally open to the atmosphere, a pressure operated servo-motor of the diaphragm type connected at one side to the bleeder line and power transmitting means between the other side of the motor and the valve for opening the latter, said bleeder line being adapted to be capped and thereby rendered inaccessible to the atmosphere to cause suction to develop differential fluid pressure within the servomotor for opening the valve, and a pressure equalizing spring at the engine side of the motor rendered operative when the bleeder line is rendered accessible to atmospheric pressure.

6. In a vacuum operated braking system for automotive vehicles the combination with an internal combustion engine, its intake manifold, a control valve for the braking system, and a vehicle-control element having a ported duct, of a bleeder line connected with and constantly open to the intake manifold and normally open to the atmosphere through the ported duct, a motor for operating the control valve and connected to the bleeder line, said ported duct being adapted to be capped and thereby render the bleeder line inaccessible to atmospheric pressure to cause the suction to develop differential fluid pressure within the motor to operate the valve for applying the brakes, and automatic means tending to equalize pressures in the motor when the ported duct is uncapped, and thereby render the motor inoperative.

7. The combination with an internal combustion engine, its intake manifold, brake applying mechanism including brake-rigging, fluid pressure operated brake motors for said rigging, a suction connection between said motors and the intake manifold, and a control valve in said connection, of a bleeder line connected with the suction-connection between the intake manifold and the control valve and constantly open to the intake manifold, said bleeder line also being normally open to the atmosphere, a motor for operating the control valve and connected to the bleeder line, said bleeder line being adapted to be capped and thereby rendered inaccessible to atmospheric pressure to cause the suction to develop differential fluid pressure within the motor to operate the valve for applying the brakes, and automatic means for rendering the motor inoperative when the bleeder line is rendered accessible to atmospheric pressure by tending to equalize pressure in the motor.

8. The combination with an automotive propelling engine and its intake manifold, fluid pressure operated brake-applying mechanism, and means for controlling said mechanism, of a control device for said means, a bleeder line in constant communication with the intake manifold and normally open to the atmosphere, said control device connected to the bleeder line and capable of being rendered inaccessible to atmospheric pressure to apply the brakes and also operable during acceleration of the engine for releasing the brakes while said device is inaccessible to the atmosphere from the bleeder line.

DOUGLAS COLLINS.